United States Patent [19]

Schmitt et al.

[11] Patent Number: 5,367,074
[45] Date of Patent: Nov. 22, 1994

[54] PREPARATION OF 7,16-DICHLORODIANTHRAQUINONE-N,N'-DIHYDROAZINE

[75] Inventors: Michael Schmitt, Worms; Matthias Niedenbrueck, Limburgerhof, both of Germany

[73] Assignee: BASF Aktiengesellschaft, Ludwigshafen, Germany

[21] Appl. No.: 79,939

[22] Filed: Jun. 23, 1993

[30] Foreign Application Priority Data

Jul. 1, 1992 [DE] Germany .............................. 4221605

[51] Int. Cl.$^5$ .......................................... C07D 241/46
[52] U.S. Cl. ..................................... 544/339; 544/341
[58] Field of Search ............................... 544/339, 341

[56] References Cited

U.S. PATENT DOCUMENTS 3,839,322 10/1974 Moergieli ............................ 544/180
4,628,091 12/1986 Kato .................................... 544/339

FOREIGN PATENT DOCUMENTS 1420366 1/1976 Germany .
4217954 5/1992 Germany .

OTHER PUBLICATIONS

Industrial and Engineering Chemistry, 369–375, 1929.
Journal of the Society of Chemical Industry Japan, 193B–195B, 1938.
Journal of the American Chemical Society, 56, 2130–31, 1934.

Primary Examiner—Mukund J. Shah
Assistant Examiner—Y. N. Gupta
Attorney, Agent, or Firm—Oblon, Spivak, McClelland, Maier & Neustadt

[57] ABSTRACT

7,16-Dichlorodianthraquinone-N,N'-dihydroazine (I)

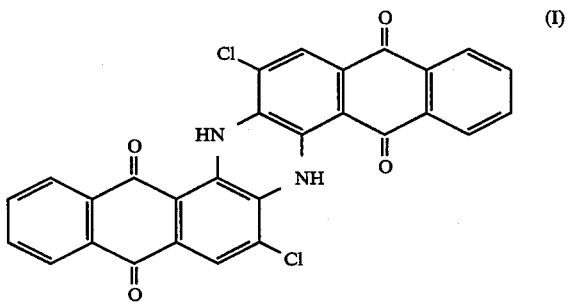

is prepared by condensing 1-amino-3-chloroanthraquinone (II) in the presence of an alkaline condensing aid, of an oxidizing agent and of a urea derivative (III)

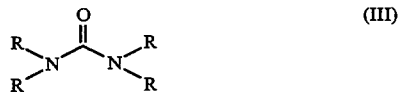

(R: identical or different alkyl groups having 1 to 4 carbon atoms, which may be joined together to form a 5- or 6-membered ring that contains the urea group).

4 Claims, No Drawings

PREPARATION OF 7,16-DICHLORODIANTHRAQUINONE-N,N'-DIHYDROAZINE

DESCRIPTION

The present invention relates to a novel process for preparing 7,16-dichlorodianthraquinone-N,N'-dihydroazine (I)

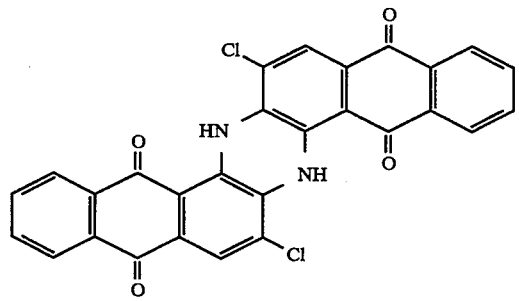

7,16-dichlorodianthraquinone-N,N'-dihydroazine (I), which is also known as 3,3'-dichloroindanthrone, corresponds to the important vat dye C.I. Vat Blue 6.

Existing processes for preparing dichloroindanthrone (I) start either from 2- or 1-amninoanthraquinone and condense it initially to the unsubstituted indanthrone in the presence of an alkaline condensing aid and of an oxidizing agent. As described in DE-A-3 422 385 and the earlier German Patent Application P 42 17 954.8, the condensation of 1-amninoanthraquinone is advantageously carried out in the presence of a cyclic urea derivative.

The desired chloroindanthrone is then obtained in a second reaction step by chlorinating the indanthrone, which is predominantly carried out in sulfuric acid (see Venkataraman, The Chemistry of Synthetic Dyes, vol. II, p. 939 (1952). In the course of the chlorination in sulfuric acid the indanthrone is at the same time oxidized to the azine, which then has to be reduced back to the dihydroazine using reducing agents such as aluminum powder or iron (II) salts. Moreover, the product is in general a mixture of monochlorinated, dichlorinated and trichlorinated indanthrone; selective chlorination in the 3,3'-position is not possible. A high level of the trichlorinated product, in particular, then results in greener and duller hues.

It is an object of the present invention to remedy these defects and to make 3,3'-dichloroindanthrone available in good purities and good yields in a simple and hence economical manner.

We have found that this object is achieved by a process for preparing 7,16-dichlorodianthraquinone-N,N'-dihydroazine (I)

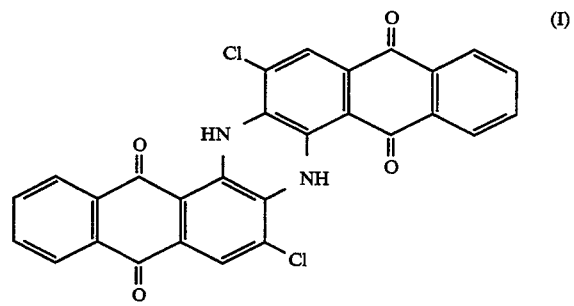

which comprises condensing 1-amino-3-chloroanthraquinone (II) in the presence of an alkaline condensing aid, of an oxidizing agent and of a urea derivative of the formula (III)

where the radicals R are identical or different alkyl groups of from 1 to 4 carbon atoms, which may also be joined together to form a 5- or 6-membered ring that contains the urea group.

The starting 1-amino-3-chloroanthraquinone (II) is known and can be prepared for example by Hofmann degradation of 3-chloroanthraquinone-1-carboxamide (DE-A-2 222 857).

The process of the invention can be carried out under the process conditions known for the condensation of aminoanthraquinones to indanthrone and described for example in DE-A-3 422 385 or the earlier German Patent Application P 42 17 954.8.

What is essential is the presence of a urea derivative of the formula (III). As well as ureas substituted by 4 identical or different $C_1$-$C_4$-alkyl groups R, such as tetramethyl-, tetraethyl-, tetra-n-propyl-, tetra-n-butyl- or dimethyldiethyl urea, suitable urea derivatives are in particular cyclic ones where 2 of the radicals R are joined to one another into a 5- or 6-membered ring forming an ethylene- or propylene- urea. The preference is here for example for N,N'-diethyl- or N,N'-di-n-propylethyleneurea and N,N'-diethyl- or N,N'-di-n-propyl-propyleneurea, in particular N,N'-dimethylethyleneurea and very particularly N,N'-dime-thyl-propyleneurea.

The urea (III) is in general used in amounts of from 0.05 bis 10 parts by weight, preferably from 0.1 bis 5 parts by weight, particularly preferably from 1 to 3 parts by weight, per part by weight of 1-amino-3-chloroanthraquinone (II), if desired as a mixture with an inert, organic solvent such as dimethyl sulfoxide, pyridine, toluene or xylene.

The alkaline condensing aid used can be one of the bases customarily used for this purpose such as sodium hydroxide or in particular potassium hydroxide. It can be used in the form of a solid or preferably in the form of an aqueous solution, preferably 50% by weight in strength. The amount used is in general from 0.1 to 10 parts by weight, preferably from 0.2 to 2.5 parts by weight, per part by weight of (II).

Suitable oxidizing agents are air, oxygen, peroxidic salts such as perborates, nitrates and chlorates. It is particularly advantageous to use air or oxygen.

In some cases it can be of advantage to add to the reaction medium a wetting agent which does not react under the reaction conditions, for example a naphthalene- or alkylnaphthalene-sulfonate or sulfurated oleamide.

The reaction temperature of the process according to the invention is in general from 80° to 150° C. and depends on the amount of N,N'-dimethylpropyleneurea.

An advantageous way of carrying out the process is to introduce a mixture of 1-amino-3-chloroanthraquinone (II) and urea derivative as the initial charge, heat it to about 90°–100° C. and then add the condensing aid while passing air through the reaction mixture at a rate of about 200–300 ml/min. After all the condensing aid has been added, the temperature is preferably raised to 120°–130° C., distilling off some of the water.

The reaction generally takes from 4 to 12 h. Its end can be determined in a conventional manner by thin layer chromatography.

The reaction mixture can be worked up for the chloroindanthrone (I) in a conventional manner by precipitating with water and filtering off.

N,N'-dimethylpropyleneurea can advantageously be recovered from the aqueous phase by distillation or solvent extraction and used for further reactions.

Then the product (I) is in general subjected to a conventional purifying aftertreatment. For this it is advantageously first suspended in water and reduced to the leuco form using a reducing agent such as sodium dithionite, thiourea dioxide, hydroxyacetone or glucose in the presence of a base such as sodium hydroxide. The sodium salt of the leuco form can then be filtered off again, washed with water and air oxidized back to the chloroindanthrone (I).

The process of the invention gives 7,16-dichlorodianthraquinone-N,N'-dihydroazine (3,3'-dichloroindanthrone; (I)) in very good yield and high purity, so that blue dyeings of high cleanness of hue and brilliance can be obtained. It is of particular advantage that the synthesis of chloroindanthrone (I) is significantly simplified over the known, two-stage processes and that the 3,3'-chlorinated indanthrone is obtained selectively.

If the process of the invention is applied to a starting mixture of 1-amino-3-chloroanthraquinone and unchlorinated 1-aminoanthraquinone, it is also possible to obtain chlorcindanthrones having a lower degree of chlorination with advantage without running any risk of also producing more highly chlorinated indanthrones at the same time.

EXAMPLE

A mixture of 172.6 g of 1-amino-3-chloroanthraquinone and 270 g (220 ml) of N,N'-dimethylpropyleneurea was heated to 95°–100° C. 141 g of 50% strength by weight potassium hydroxide solution were then added dropwise over 3 h while an air stream was passed through the reaction mixture at a rate of 300 ml/min. The temperature was then raised to 125°–130° C. for 8 h, distilling off some of the water. The end of the reaction was determined by thin layer chromatography (absence of 1-amino-3-chloroanthraquinone).

The product (I) was precipitated by introducing the reaction mixture into 800 ml of water, filtered off and washed.

To purify it the filter residue was stirred into a solution of 152 g of sodium hydroxide in 4900 ml of water. After 83 g of sodium dithionite had been added at 60° C. the mixture was additionally stirred for 20 min. At 50° C. the precipitated sodium salt of the leuco-chloroindanthrone was filtered off, washed and air oxidized.

The yield was 137 g of 3,3'-dichloroindanthrone (I) having a chlorine content of 13.4% by weight (calculated 13.8% by weight), corresponding to 80% of theory.

We claim:

1. A process for preparing 7,16-dichlorodianthraquinone-N,N'-dihydroazine (I)

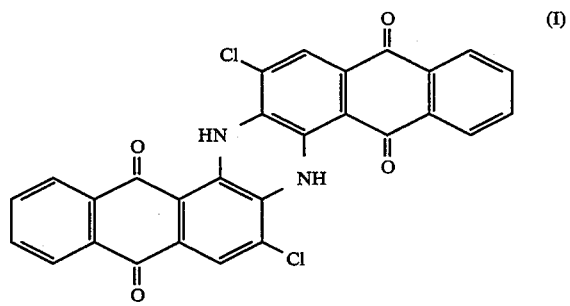

which comprises condensing 1-amino-3-chloroanthraquinone (II) in the presence of an alkaline condensing aid, of an oxidizing agent and of a urea derivative of the formula (III)

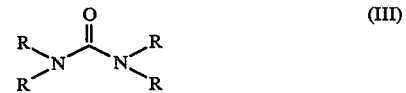

where the radicals R are identical or different alkyl groups of from 1 to 4 carbon atoms, which may also be joined together to form a 5- or 6-membered ring that contains the urea group.

2. A process as claimed in claim 1, wherein a cyclic urea derivative is used.

3. A process as claimed in claim 1, wherein the urea derivative used is N,N'-dimethylpropyleneurea.

4. A process as claimed in claim 1, wherein the condensation is carried out at from 80° to 150° C.

* * * * *